United States Patent
Lam et al.

(10) Patent No.: US 9,001,837 B2
(45) Date of Patent: Apr. 7, 2015

(54) EXTENDING A LOCAL AREA NETWORK

(71) Applicant: Google Inc., Mountain View, CA (US)

(72) Inventors: Cedric Fung Lam, Milpitas, CA (US); Tony Ong, San Jose, CA (US); Ke Dong, San Jose, CA (US); Steven Fong, Sunnyvale, CA (US); Yut Loy Chan, San Jose, CA (US); Yifan Gao, Fremont, CA (US); Milo Steven Medin, Redwood City, CA (US); Dov Shimon Zimring, San Francisco, CA (US)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 13/650,984

(22) Filed: Oct. 12, 2012

(65) Prior Publication Data

US 2013/0230034 A1    Sep. 5, 2013

Related U.S. Application Data

(62) Division of application No. 13/411,172, filed on Mar. 2, 2012, now Pat. No. 8,315,266.

(51) Int. Cl.
*H04L 12/28* (2006.01)
*H04L 12/66* (2006.01)
*H04L 29/06* (2006.01)

(52) U.S. Cl.
CPC ........ *H04L 12/2834* (2013.01); *H04L 12/2856* (2013.01); *H04L 12/66* (2013.01); *H04L 29/0621* (2013.01); *H04J 2203/0003* (2013.01); *H04J 2203/0001* (2013.01); *H04L 12/2898* (2013.01); *H04L 2012/2841* (2013.01)

(58) Field of Classification Search
CPC ................... H04L 65/1023; H04L 2012/5618; H04L 12/2856; H04L 12/66; H04J 2203/0003; H04J 2203/0001
USPC .......................... 370/401, 465, 274, 285, 391
See application file for complete search history.

(56) References Cited

U.S. PATENT DOCUMENTS

| | | | | |
|---|---|---|---|---|
| 6,408,437 B1 * | 6/2002 | Hendricks et al. | ............ | 725/132 |
| 7,532,605 B2 * | 5/2009 | Wakeley et al. | ............... | 370/338 |
| 7,599,391 B1 * | 10/2009 | Lo | ................... | 370/465 |
| 7,827,313 B2 * | 11/2010 | Salmela et al. | ................ | 709/246 |
| 7,992,177 B2 | 8/2011 | Perry et al. | | |
| 8,037,505 B2 * | 10/2011 | Ou et al. | .......................... | 725/91 |

(Continued)

OTHER PUBLICATIONS

International Search Report for Application No. PCT/US2012/059956 dated Mar. 19, 2013.

*Primary Examiner* — Ricky Ngo
*Assistant Examiner* — Dewanda Samuel
(74) *Attorney, Agent, or Firm* — Honigman Miller Schwartz and Cohn LLP

(57) ABSTRACT

A local area network system that includes a residential gateway in wired communication with a remote service provider and multiple set top boxes in wired communication with the residential gateway. Each set top box includes a network extender having a wired connection to a residential gateway of a local area network, a media player in communication with the network extender, and at least one wireless transceiver in communication with the network extender. The media player includes a computing processor executing instructions to format a signal received from the network extender for use by a media device. Each set top box is configured as an access point for a local area network of the residential gateway.

19 Claims, 8 Drawing Sheets

(56) References Cited

U.S. PATENT DOCUMENTS

| | | | |
|---|---|---|---|
| 8,386,592 B2 * | 2/2013 | Davis et al. | 709/223 |
| 8,553,882 B2 * | 10/2013 | Cholas et al. | 380/210 |
| 2002/0059642 A1 * | 5/2002 | Russ et al. | 725/135 |
| 2003/0122966 A1 | 7/2003 | Markman et al. | |
| 2006/0072622 A1 | 4/2006 | Cho | |
| 2007/0201872 A1 * | 8/2007 | Yim et al. | 398/66 |
| 2009/0067441 A1 | 3/2009 | Ansari et al. | |
| 2009/0313675 A1 | 12/2009 | Howarter et al. | |
| 2010/0016683 A1 | 1/2010 | Lemmers et al. | |
| 2011/0004893 A1 * | 1/2011 | Borislow et al. | 725/25 |
| 2011/0280249 A1 * | 11/2011 | Shrum et al. | 370/401 |

\* cited by examiner

EXTENDING A LOCAL AREA NETWORK

CROSS REFERENCE TO RELATED APPLICATIONS

This U.S. patent application is a divisional of, and claims priority under 35 U.S.C. §121 from, U.S. patent application Ser. No. 13/411,172, filed on Mar. 2, 2012, which is hereby incorporated by reference in its entirety.

TECHNICAL FIELD

This disclosure relates to an internet protocol media player with network extender functions for extending a local area network.

BACKGROUND

Generally, a home network includes a single WiFi enabled access point (AP) built into a home network gateway (also called a residential gateway), which is usually located in a living room or a home office of the home. WiFi performance typically varies with distance between WiFi enabled mobile devices and the access-point and may be adversely affected by certain obstacles inside the home. As a result, a home network using a single access point can become challenging in 2- or 3-story single family houses or residences constructed of reinforced concrete or metal.

SUMMARY

The Internet may provide next generation high-speed data and digital media services such as voice, video, gaming, etc. Broadband networks using fiber optic technologies to an end-user residence may remove a bandwidth bottleneck between network operators and an end-user by offering Gigabit per second and beyond access speeds. To make efficient use of the access bandwidths available through fiber optic access technologies, efficient in-house connectivity may be necessary to connect various digital players and home networking devices within the end-user residence.

Many homes, especially in North America, have an existing coaxial cable infrastructure, due to the general prevalence of cable based television connectivity. Many modern residences also have structured wiring of Category 5 or newer twisted pair Ethernet connections. Coaxial cables are broadband copper media having usable bandwidths up to about 1 GHz. The present disclosure provides an internet protocol (IP) media player having network extender functions that allow a user to extend a home network using existing coaxial cables. In some implementations, a local area network (LAN) and/or WiFi network are bridged through coaxial cables with a bridging device. Coaxial cables typically terminate at televisions or displays where entertainment media is consumed and broadband data connectivity may be needed to support new forms of digital entertainment. Arranging the IP media player function with network extension functions or even integrating the two into one single home device may be advantageous for extending a local area network and/or delivering high-speed broadband data connectivity to several localities within a home.

Multiple access points within a home may be used to improve signal coverage in a relatively large home or a home having rooms separated by concrete or metal walls. In many newly constructed homes, structured wiring of Category 5 or 6 twisted copper pairs are available to support 1 Gb/s data connectivity from a wiring closet. High-definition contents such as 4 k-resolution and 3-D videos may require relatively high bandwidth connectivity from a residential gateway to a set top box, which may not be available with existing wireless connections offered by a single access point. Moreover, it is difficult to guarantee a quality of service (QoS) with wireless connections offered by WiFi connectivity. In some implementations, the set top box includes network bridging, allowing the set top box to act as a network extender for in-home networking. The network extender may extend the coverage of WiFi connectivity through Layer 2 bridging using coaxial cable or structured Ethernet connections. Moreover, the set top box may extend the Ethernet connectivity through coaxial bridging.

One aspect of the disclosure provides a set top box that includes a network extender and a media player in communication with the network extender. The network extender is connectable to a residential gateway of a local area network through a wired connection. The media player includes a computing processor executing instructions to format a signal received from the network extender for use by a media device. The set top box also includes at least one wireless transceiver in communication with the network extender.

Implementations of the disclosure may include one or more of the following features. In some implementations, the set top box includes memory for storing the executable instructions. The network extender may be a network bridge or a switch having multiple ports. In some implementations, the network extender is capable of providing at least a 1 Gb/s data transfer rate.

The at least one wireless transceiver may be configured as a WiFi access point having the same service set identifier(s) (SSID(s)) as the residential gateway. In some examples, the residential gateway passes the SSID(s) to the network extender.

The set top box may include an application-specific integrated circuit integrating thereon the network extender, the media player, and/or the at least one wireless transceiver. In some examples, the set top box includes a Bluetooth transceiver and/or an infrared transceiver in communication with the network extender. Moreover, the media player may be an internet protocol media player.

Another aspect of the disclosure provides a local area network system that includes a residential gateway in wired communication with a remote service provider and multiple set top boxes in wired communication with the residential gateway. Each set top box includes a network extender having a wired connection to a residential gateway of a local area network, a media player in communication with the network extender, and at least one wireless transceiver in communication with the network extender. The media player includes a computing processor executing instructions to format a signal received from the network extender for use by a media device. Each set top box is configured as an access point for a local area network of the residential gateway.

In some implementations, the network extender is a network bridge or a switch having multiple ports. The network extender may be capable of providing at least a 1 Gb/s data transfer rate.

The at least one wireless transceiver of each set top box may be configured as a WiFi access point having the same service set identifier(s) as the residential gateway. Moreover, the residential gateway can pass the service set identifier(s) to each set top box.

In some implementations, each set top box further includes an application-specific integrated circuit integrating thereon the network extender, the media player, and/or the at least one wireless transceiver. Each set top box may include a Bluetooth transceiver and/or an infrared transceiver in communication with the network extender.

The local area network system may include an optical network terminal in communication with the residential gateway. The optical network terminal may be integrated with the residential gateway and configured as an access point. In some examples, the wired connection from the remote service provider is a fiber optic cable connection. Moreover, the wired connection between the set top boxes and the residential gateway may be a coaxial cable connection and/or over an RJ-45 interface.

In yet another aspect, a method of extending a local area network includes placing multiple set top boxes about a residence and establishing a wired connection between each set top box and a residential gateway of the local area network. Each set top box includes a network extender having a wired connection to the residential gateway, a media player in communication with the network extender, and at least one wireless transceiver in communication with the network extender. The media player includes a computing processor executing instructions to format a signal received from the network extender for use by a media device. Each set top box receives data packets from the residential gateway through the corresponding wired connections and is an access point for the local area network.

In some implementations, the method includes establishing a wireless connection between at least one of the set top boxes and a local computing device in the local area network. The wireless connection may be a WiFi connection, a Bluetooth connection, or an infrared connection. The method may include establishing a wired connection between the residential gateway and a remote service provider. The wired connection may be a fiber optic connection.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

New access technologies, such as fiber to the home (FTTH), are removing the bandwidth bottleneck between Internet service providers and end-user homes by providing sustainable and symmetric 1 Gb/s connectivity to end users. Such fiber access technology could potentially increase an access bandwidth to 10 Gb/s or above between service providers and end users.

Figure 1A:
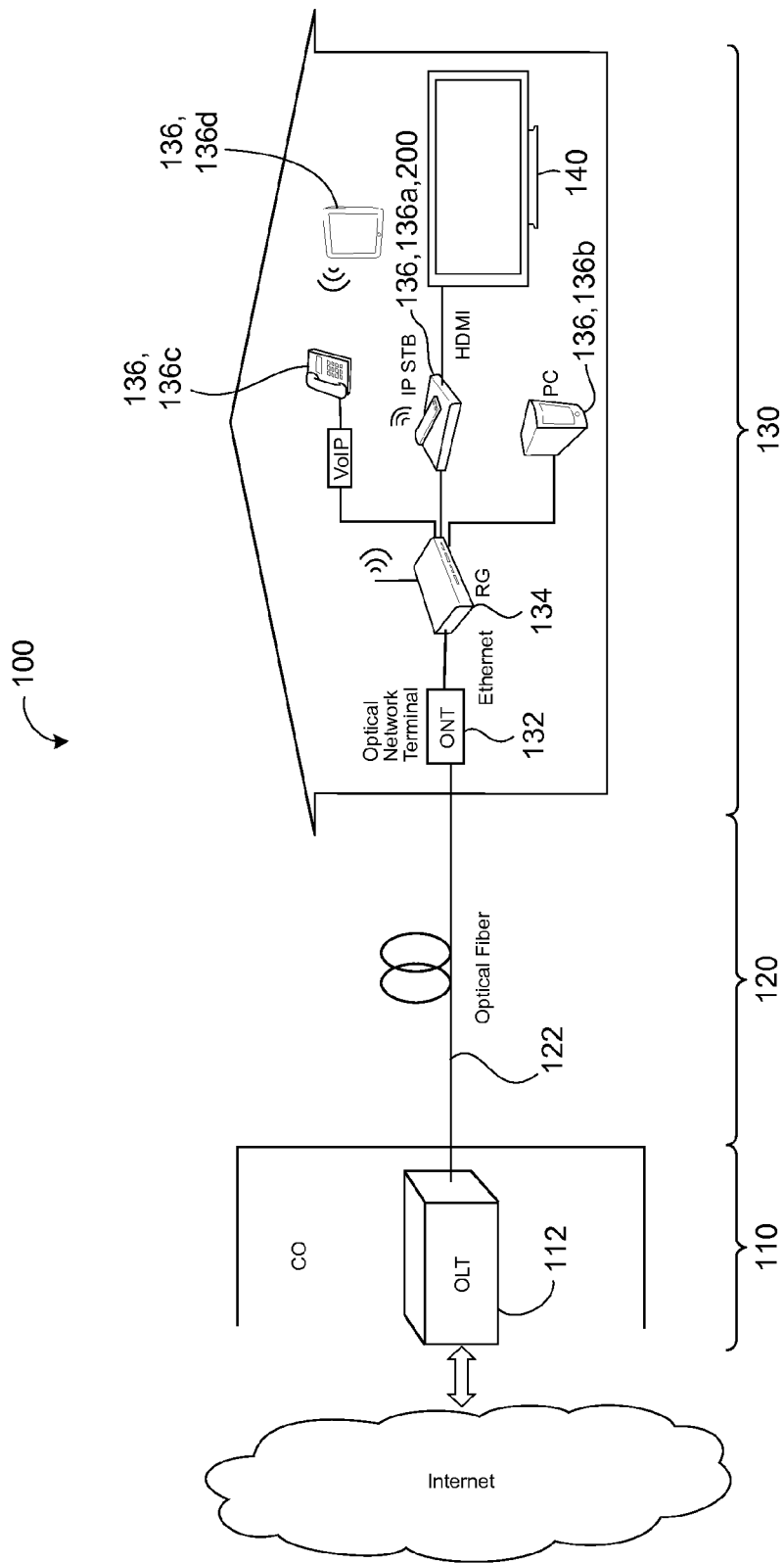
FIGS. 1A and 1B provide schematic views of exemplary architectures of a fiber-to-the-home (FTTH) network.
Figure 1B:
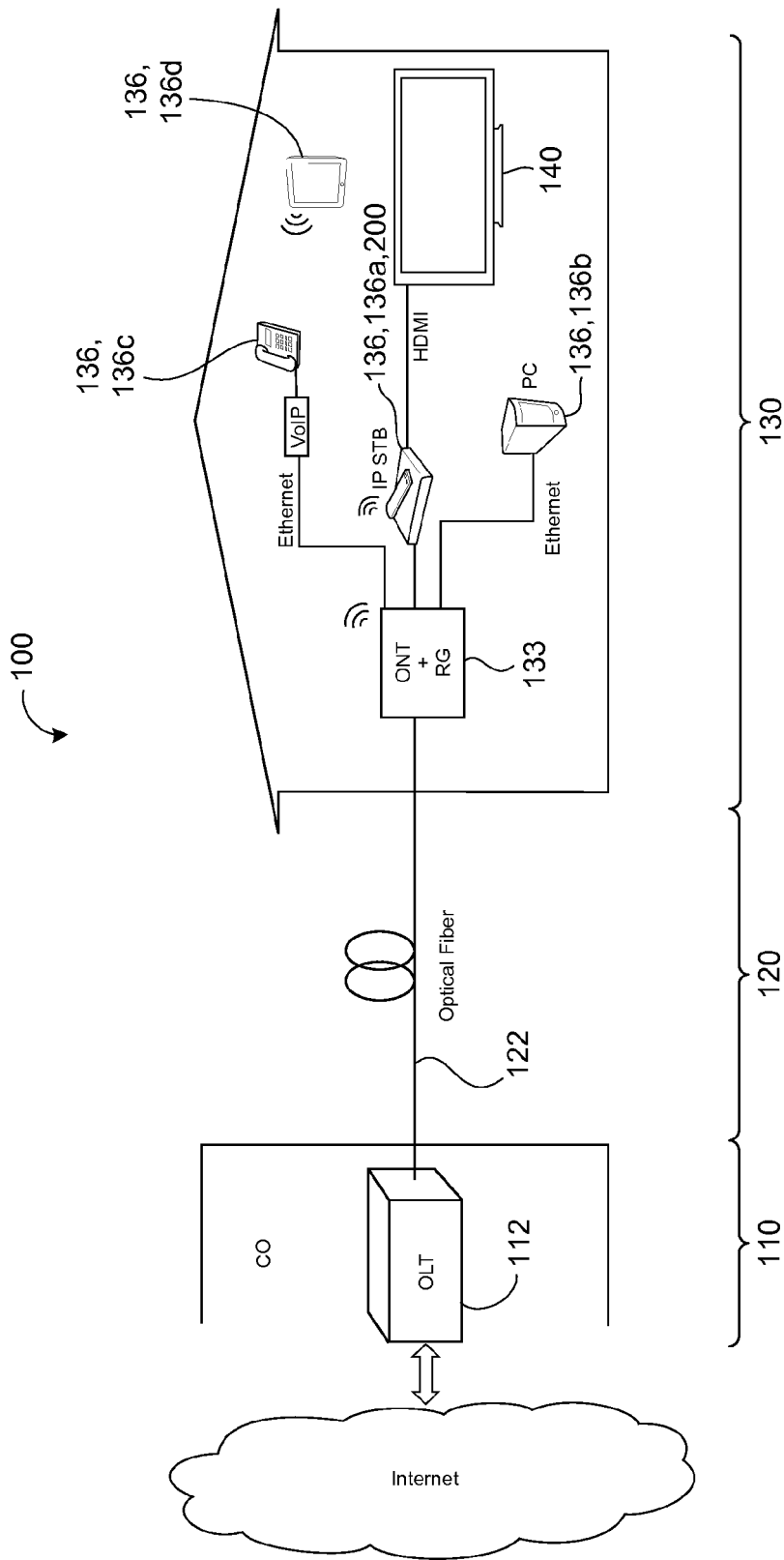

FIGS. 1A and 1B provide schematic views of exemplary architectures of a fiber-to-the-home (FTTH) network 100 establishing fiber-optic communications between an Internet service provider 110 and a residential network 130 of an end-user. An optical line termination 112 (OLT) may provide a service provider endpoint for a passive optical network 120 that includes optical fiber 122 connecting the Internet service provider 110 to the end-user residential network 130. The optical line termination 112 converts electrical signals used by service provider equipment to/from fiber-optic signals used by the passive optical network 120. The optical line termination 112 also coordinates multiplexing between conversion devices (e.g., optical network terminals).

An optical network terminal 132 (ONT) converts an optical signal received from the Internet service provider 110 (over the passive optical network 120) into an electrical signal and provides Layer 2 media access control functions for the end-user residential network 130. The media access control (MAC) data communication protocol sub-layer, also known as the medium access control, is a sub-layer of the data link layer (Layer 2) specified in the seven-layer Open Systems Interconnection model (OSI model). Layer 1, the physical layer, defines electrical and physical specifications for devices. Layer 2, the data link layer, provides addressing and channel access control mechanisms, allowing several terminals or network nodes to communicate within a multiple access network incorporating a shared medium, e.g., Ethernet or coaxial cables.

A residential gateway 134 (RG) of the residential network 130 provides Layer 3 network termination functions. The residential gateway 134 may be equipped with multiple Internet protocol (IP) interfaces. In some implementations, the optical network terminal 132 and the residential gateway 134 are integrated as a single optical network—residential gateway device 133 (as shown in FIG. 1B). The residential gateway 134 acts as an access point for the residential network 130, for example, by offering WiFi connectivity to the residential network 130.

IP network devices 136 may be connected to the residential gateway 134 through a wired connection, such as a coaxial interface 135, an RJ-45 interface 137, and/or a wireless interface, such as an RG-45 Ethernet interface for 802.11 WiFi. In the example shown, an IPTV set top box 136a (STB), interfaces with the Internet through an RJ-45 connection with the residential gateway 134 and with a television 140 through a high definition multimedia interface (HDMI). Other possible IP network devices 136 that may be connected to the residential gateway 134 include a computer 136b, a voice-over-IP phone 136c, and/or a portable electronic device 136d (e.g., cell phone, tablet computer, etc.). POTS (plain old telephone service) terminations 138 (FIG. 2B) may also be provided by the optical network terminal 132 and/or the residential gateway 134.

Figure 2A:
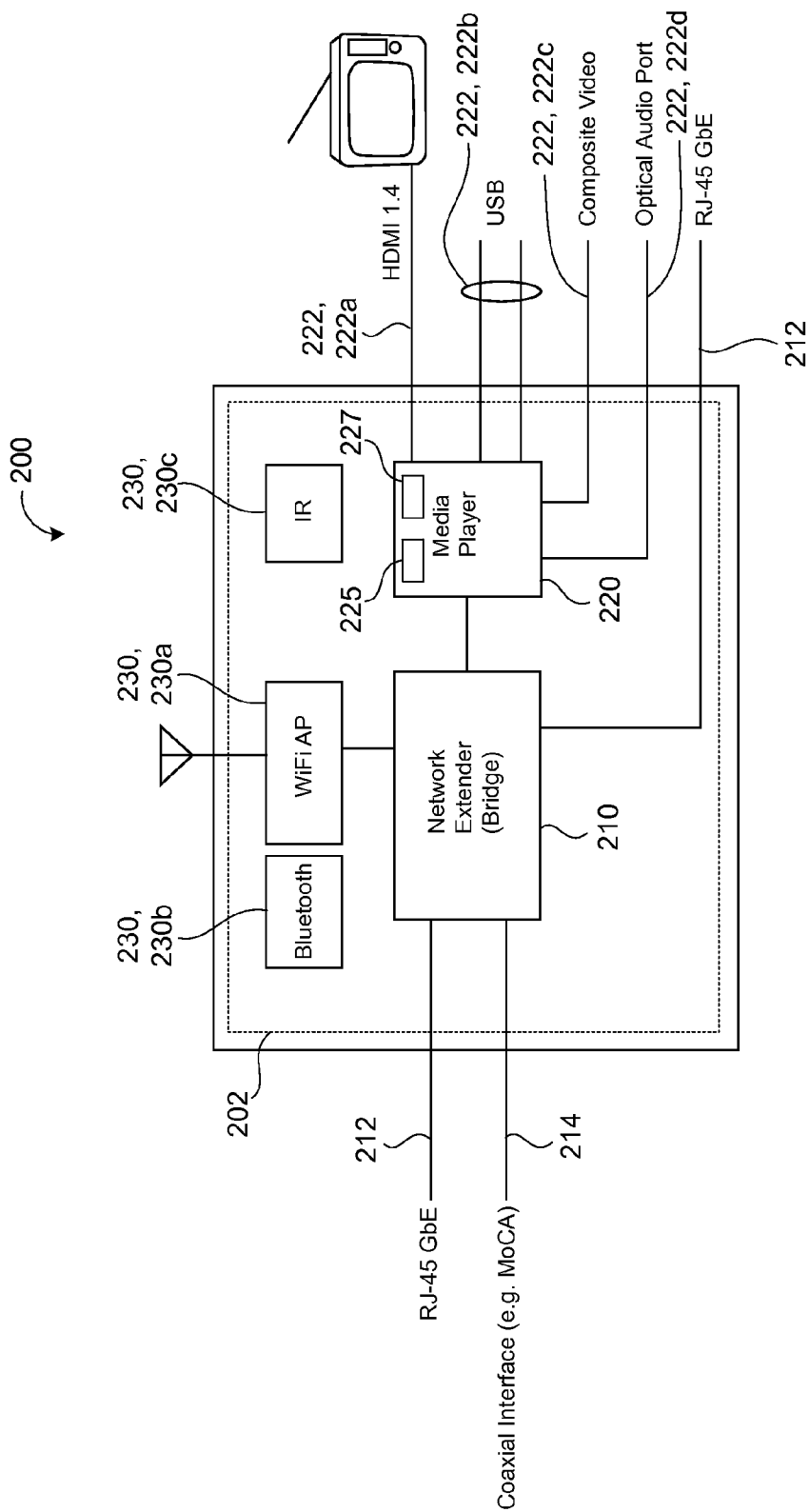
FIG. 2A provides a schematic view of an exemplary set top box.

FIG. 2A provides a schematic view of an exemplary set top box 200, which may connect to the Internet through a wired connection. The term wired connection or wired communication refers to the transmission of data over a wire-based or cable-based communication technology, such as, but not limited to, telephonic lines and/or networks, coaxial cables, television or internet access through a cable medium, fiber-optic cables, etc. Since current WiFi technologies cannot offer 1 Gb/s connectivity, a WiFi interface between the set top box 200 and the residential gateway 134 may cause a bandwidth bottleneck in the residential network 130.

WiFi throughput and performance depends on many factors such as distance from an access point, obstructions by walls, interference from other sources, etc. In a household where multiple set top boxes 200 are needed (e.g., one in each bedroom), Wi-Fi connectivity between the set top boxes 200 and a residential gateway 134 acting as a single wireless access point for the residential network 130 could be problematic. With a single Wi-Fi access point, the WiFi coverage in a typical suburban household could be sporadic with blind spots having bad signal throughput and reception. Moreover, total bandwidth of a single access point may be insufficient to support all in-home networking needs.

The set top box 200 includes a network extender 210 providing network extension functionality, extending accessibility of the residential network 130 and improving coverage of the residential network 130. The network extender 210 may be a network bridge offering layer 2 bridging capability or a network switch (e.g., a bridge with numerous ports). In some examples, the network extender 210 includes one or more RJ-45 local area network (LAN) connections 212 and/or a coaxial interface 214, which could, for example, comply with the MoCA (Multimedia over coaxial cable Alliance) standard or ITU-T G.hn standard.

Bridging is a forwarding technique used in packet-switched computer networks. Unlike routing, bridging makes no assumptions about where in a network a particular address is located. Instead, it depends on flooding and examination of source addresses in received packet headers to locate unknown devices. Once a device has been located, its location can be recorded in a table where the source address is stored so as to avoid the need for further flooding. The bridging capability of the network extender 210 extends the residential network 130 as a local area network. As a network bridge, the network extender 210 may connect multiple network segments at the data link layer (Layer 2) of the Open Systems Interconnection model (OSI) model. Moreover, the network extender 210 may support multiple virtual local area networks (VLANs) inside the residential network 130.

Figure 2B:
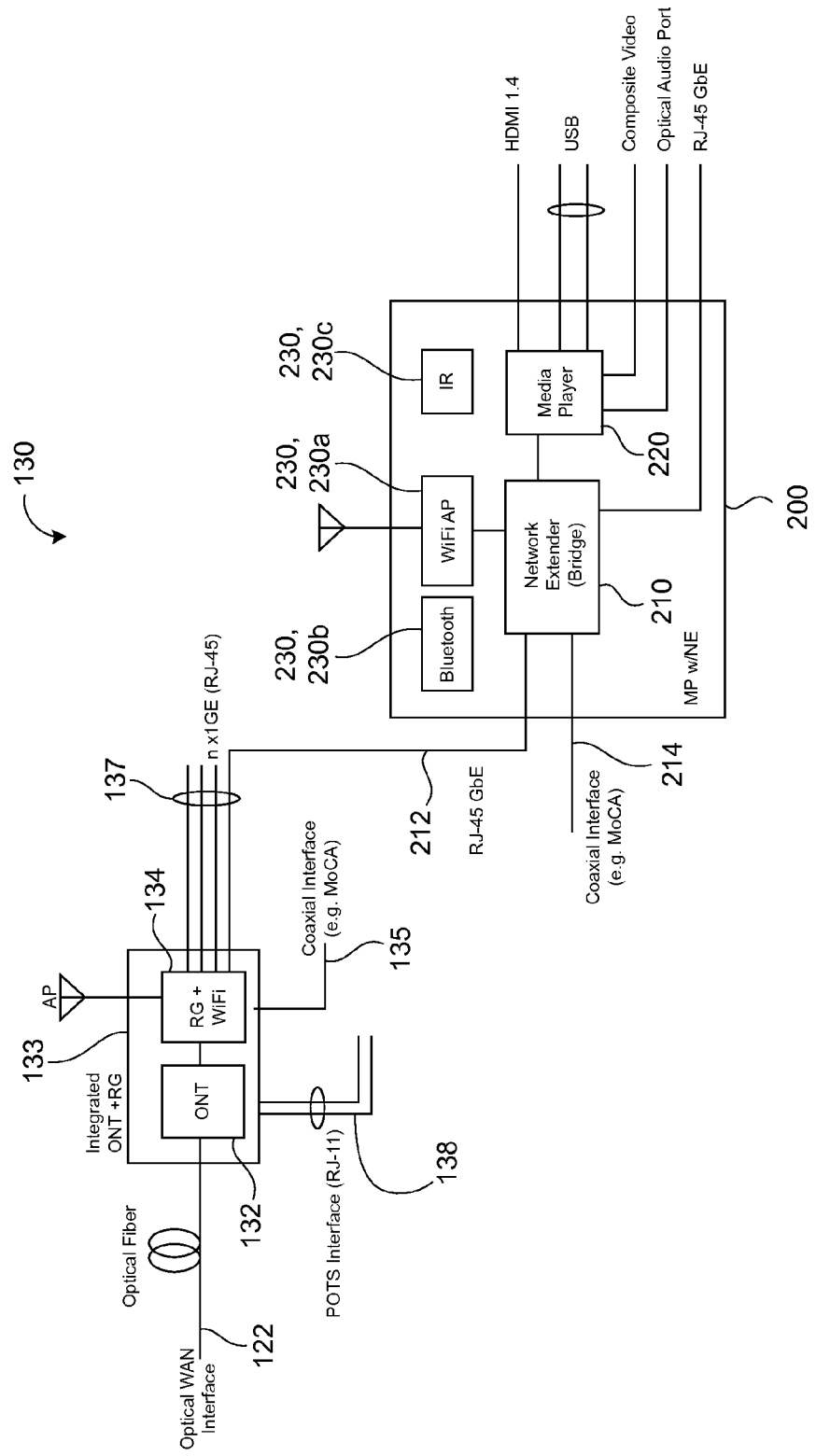
FIG. 2B provides a schematic view an exemplary residential network having a set top box connected to a residential gateway through an RJ-45 LAN interface.
Figure 2C:
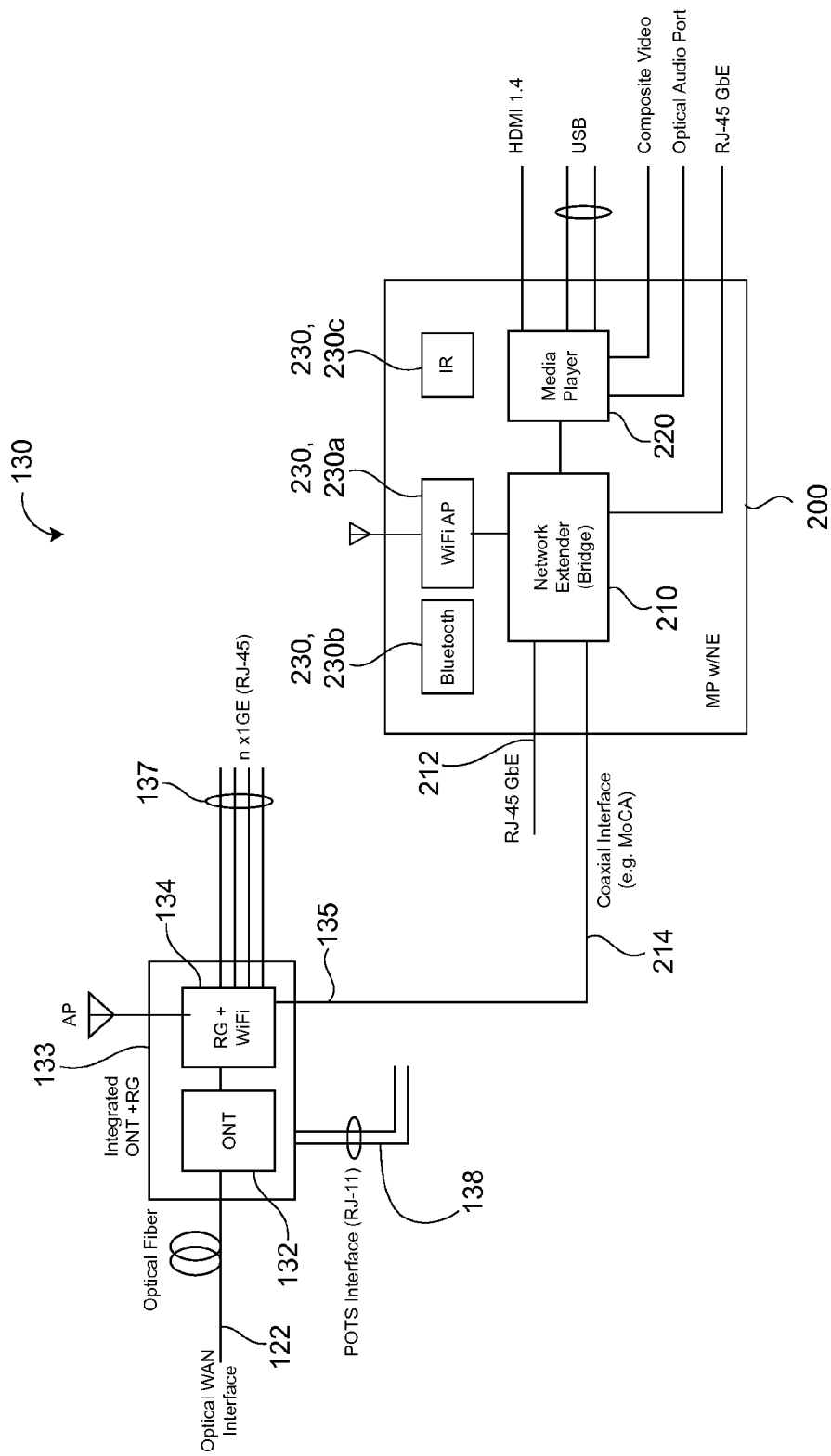
FIG. 2C provides a schematic view of an exemplary residential network having a set top box connected to a residential gateway through a coaxial interface.

FIG. 2B provides a schematic view of an exemplary residential network 130 having the set top box 200 connected to the residential gateway 134 (or integrated optical network terminal—residential gateway 133) through the RJ-45 LAN interface 212. FIG. 2C provides a schematic view of an exemplary residential network 130 having the set top box 200 connected to the residential gateway 134 (or integrated optical network terminal—residential gateway 133) through the coaxial interface 214. In both cases, the network extender 210 acts as a Layer 2 bridging device, extending the residential network 130.

Referring to FIGS. 2A-2C, in some implementations, the set top box 200 includes a media player 220 (e.g., an internet protocol and/or high definition (HD) media player) in communication with the network extender 210. The media player 220 may combine a hard drive (HD) enclosure with hardware and software for playing audio, video and photos through a home entertainment system, for example. The media player 220 may include a computing processor 225 executing instructions to format a signal received from the network extender 210 for use by a media device, such as a television 140. The media player 220 may also include memory 227 for storing the instructions. The media player 220 may include one or more peripheral interfaces 222, such as an HDMI interface 222a, a universal serial bus (USB) interface 222b, a composite video interface 222c for backward compatibility with legacy analog TVs, and/or an optical audio port interface 222d. In some implementations, the network extender 210 and the media player 220 are arranged together or even integrated together within the set top box 200 (e.g., within the same housing and/or on the same integrated circuit).

The set top box 200 may include one or more wireless transceivers 230, such as a network interface controller (NIC) 230a or Wi-Fi interface, a Bluetooth device 230b, and/or an infrared (IR) device 230c, allowing the set top box 200 to act as a wireless access point (WAP) for the residential network 130. The Bluetooth and IR interfaces may be used for communicating with a remote control.

A system on a chip or system on chip (SoC or SOC) is an integrated circuit (IC) that integrates components of a computer or other electronic system into a single chip. It may contain digital, analog, mixed-signal, and often radio-frequency functions all on a single chip substrate. In some implementations, system on a chip (SOC) technologies may be used to combine the network extender 210 with the media player 220, and/or the wireless transceiver(s) 230 on a single application-specific integrated circuit (ASIC).

The WiFi interface 230a may be configured as an access point with the same SSID(s) (service set identifier(s)) as configured by the residential gateway 134. In some examples, the residential gateway 134 just passes the SSID(s) to the network extender 210. To the end user, this creates a single seamless WiFi network that supports user roaming from one location to another location with relatively good wireless signal reception anywhere in the residential network 130. Multiple set top boxes 200, acting as WiFi access points, within the residential network 130 can be configured with frequency settings that minimize interference and offer optimal signal throughput and network robustness.

Figure 3A:
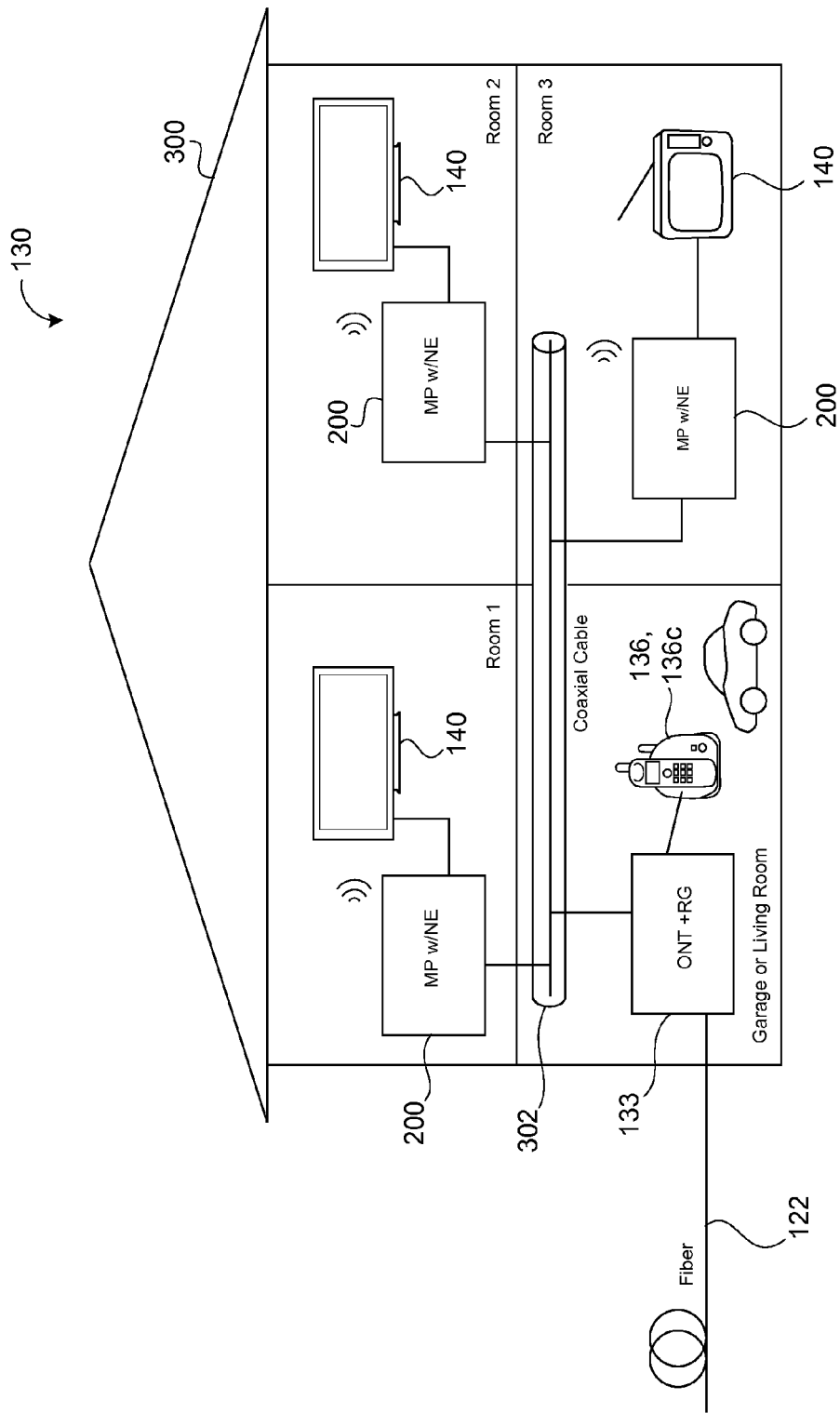
FIGS. 3A and 3B are schematic views of exemplary residential networks within a home.
Figure 3B:
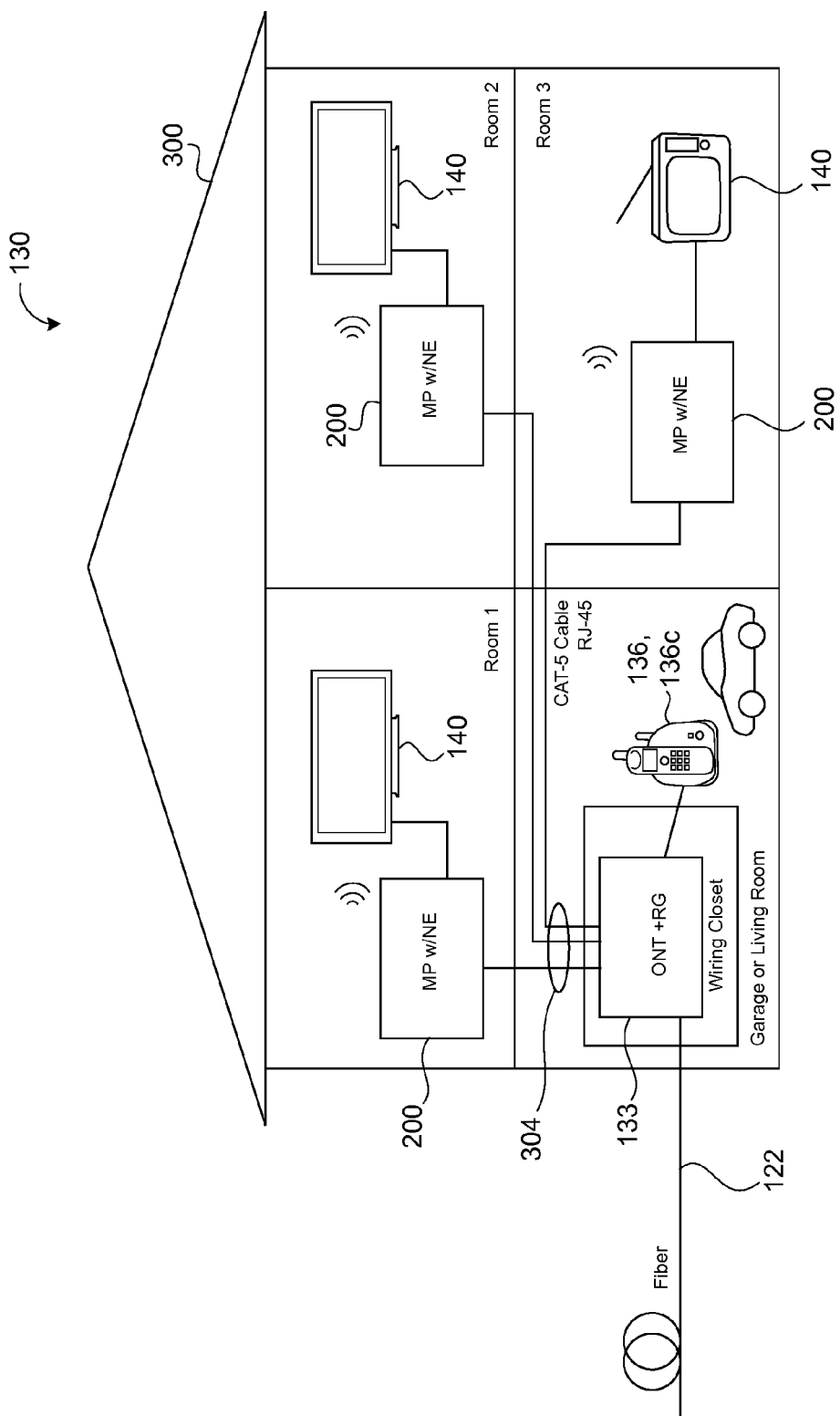

Referring to FIGS. 3A and 3B, in some implementations, a home 300 may include a coaxial network 302 and/or a structured wiring network 304 (e.g., CAT 5 wiring, RJ-45 Ethernet cables) that can be used to provide a wired connection between the residential gateway 134 (or integrated optical network terminal—residential gateway 133) and multiple set top boxes 200 (media players 220 with network extenders 210 (MP w/NE)) throughout the home 300 (e.g., in multiple rooms).

Existing structured wiring or coaxial cable within a residential home 300 can be used with multiple set top boxes 200 to expand the residential network 130. The coaxial interface is a ubiquitous broadband medium with 1 GHz bandwidth capabilities which has been widely used in cable television (CATV) signal distribution. Coaxial cable terminations in a user residence are typically located next to a television 140, which is convenient for the set top box 200. The MoCA 2.0 standard supports 400 Mb/s throughput in a single 100 MHz frequency channel on a coaxial cable network using orthogonal frequency-division multiplexing (OFDM), which is a method of encoding digital data on multiple carrier frequencies, and without MoCA channel bonding. With channel bonding (i.e. using two 100 MHz frequency channels for transmission), MoCA 2.0 can support a maximum of 800 Mb/s transmission throughput over coaxial cable. The ITU-T G.hn advertises 1 Gb/s throughput over coaxial cable.

RJ-45 LAN connections are a robust, full-duplex technology that can provide 1 Gb/s sustained throughput. In some examples, the coaxial network 302 and the structured wiring network 304 (RJ-45 interface) are used in a mixed manner where set top boxes 200 in certain sections of the home 300 are connected to the residential gateway 134 using the structured wiring network 304 (e.g., RJ-45 LAN cables) and other set top boxes 200 in other sections of the home 300 are connected to the residential gateway 134 using the coaxial network 302. To prevent Layer 2 network loops and broadcast storms, a spanning tree protocol (STP) may be executed in the coaxial network 302 and the structured wiring network 304 with the structured wiring network 304 (RJ-45 interface) receiving a higher priority than the coaxial network 302.

Figure 4:
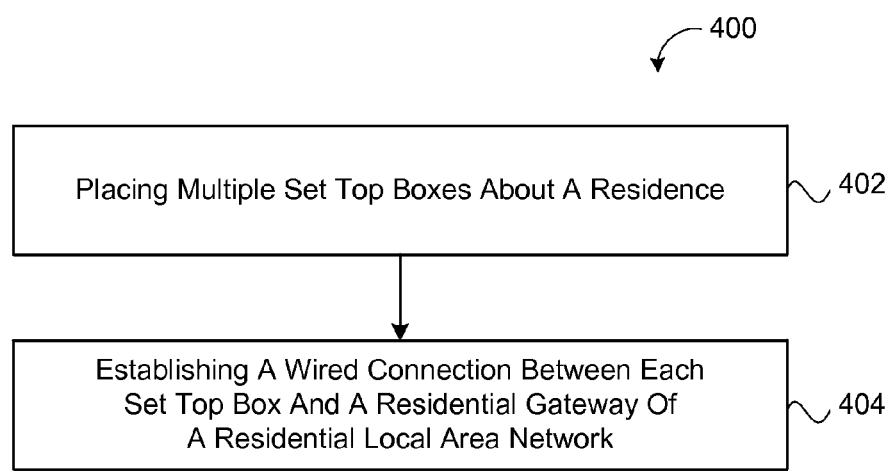
FIG. 4 is schematic view of an exemplary arrangement of operations for a method of extending a local area network.

FIG. 4 is schematic view of an exemplary arrangement 400 of operations for a method of extending a local area network. The method includes placing 402 multiple set top boxes 200 about a residence or home 300 and establishing 404 a wired connection between each set top box 200 and a residential gateway 134 of a residential local area network 130. In some implementations, the method includes establishing a wireless connection between at least one of the set top boxes 200 and a local computing device, such as a portable computer or an IP network device 136, in the residential local area network 130. The wireless connection may be a WiFi connection, a Bluetooth connection, or an infrared connection. The method may include establishing a wired connection between the residential gateway 134 (or integrated optical network terminal—residential gateway 133) and a remote service provider 110. The wired connection may be a fiber optic connection.

A number of implementations have been described. Nevertheless, it will be understood that various modifications may be made without departing from the spirit and scope of the disclosure. Accordingly, other implementations are within the scope of the following claims.

What is claimed is:

1. A local area network system comprising:
a remote residential gateway in wired communication with a remote service provider; and
multiple set top boxes in wired communication with the residential gateway, each set top box comprising:
an application-specific integrated circuit comprising and integrating thereon:
a network extender having a wired connection to a remote residential gateway of a local area network, the network extender capable of providing at least a 1 Gb/s data transfer rate; and
a media player in communication with the network extender and having a computing processor executing instructions to format a signal received from the network extender for use by a media device; and
at least one wireless transceiver in communication with the network extender, the at least one wireless transceiver configured as a WiFi access point having the same at least one service set identifier as the residential gateway, extending the local area network, the residential gateway passing the at least one service set identifier to each set top box;
wherein each set top box is configured as an access point for the local area network of the residential gateway.

2. The local area network system of claim 1, wherein the network extender comprises a network bridge.

3. The local area network system of claim 1, wherein the network extender comprises a switch having multiple ports.

4. A local area network system comprising:
a remote residential gateway in wired communication with a remote service provider; and
multiple set top boxes in wired communication with the residential gateway, each set top box comprising:
an application-specific integrated circuit comprising and integrating thereon:
a network extender having a wired connection to a remote residential gateway of a local area network; and
a media player in communication with the network extender and having a computing processor executing instructions to format a signal received from the network extender for use by a media device; and
at least one wireless transceiver in communication with the network extender, the at least one wireless transceiver configured as a WiFi access point having the same at least one service set identifier as the residential gateway, extending the local area network, the residential gateway passing the at least one service set identifier to each set top box;
wherein each set top box is configured as an access point for the local area network of the residential gateway.

5. A local area network system comprising:
a remote residential gateway in wired communication with a remote service provider; and
multiple set top boxes in wired communication with the residential gateway, each set top box comprising:
an application-specific integrated circuit comprising and integrating thereon:
a network extender having a wired connection to a remote residential gateway of a local area network;
a media player in communication with the network extender and having a computing processor executing instructions to format a signal received from the network extender for use by a media device; and
at least one wireless transceiver in communication with the network extender, the at least one wireless transceiver configured as a WiFi access point having the same at least one service set identifier as the residential gateway, extending the local area network, the residential gateway passing the at least one service set identifier to each set top box;
wherein each set top box is configured as an access point for the local area network of the residential gateway.

6. The local area network system of claim 1, wherein each set top box further comprises a Bluetooth transceiver in communication with the network extender.

7. The local area network system of claim 1, wherein each set top box further comprises an infrared transceiver in communication with the network extender.

8. The local area network system of claim 1, further comprising an optical network terminal in communication with the residential gateway.

9. The local area network system of claim 8, wherein the optical network terminal is integrated with the residential gateway and configured as an access point.

10. The local area network system of claim 8, wherein the wired connection from the remote service provider comprises a fiber optic cable connection.

11. The local area network system of claim 8, wherein the wired connection between the set top boxes and the residential gateway comprises a coaxial cable connection.

12. The local area network system of claim 8, wherein the wired communication between the set top boxes and the residential gateway comprises communication over an RJ-45 interface.

13. A method of extending a local area network, the method comprising:
placing multiple set top boxes about a residence; and
establishing a wired connection between each set top box and a residential gateway of the local area network;
wherein each set top box comprises:
an application-specific integrated circuit comprising and integrating thereon:
a network extender having a wired connection to the residential gateway; and
a media player in communication with the network extender and having a computing processor executing instructions to format a signal received from the network extender for use by a media device; and at least one wireless transceiver in communication with the network extender, the at least one wireless transceiver configured as a WiFi access point having the same at least one service set identifier as the residential gateway, extending the local area network, the residential gateway passing the at least one service set identifier to each set top box;

wherein each set top box receives data packets from the residential gateway through the corresponding wired connections and is an access point for the local area network.

14. The method of claim 13, further comprising establishing a wireless connection between at least one of the set top boxes and a local computing device in the local area network.

15. The method of claim 14, wherein the wireless connection comprises at least one of a WiFi connection, a Bluetooth connection, or an infrared connection.

16. The method of claim 13, further comprising establishing a wired connection between the residential gateway and a remote service provider.

17. The method of claim 13, wherein the application-specific integrated circuit integrates thereon the at least one wireless transceiver.

18. The method of claim 13, wherein the network extender is capable of providing at least a 1 Gb/s data transfer rate.

19. The local area network system of claim 4, wherein the network extender comprises a network bridge or a switch having multiple ports.

* * * * *